Patented Oct. 31, 1933

1,933,375

UNITED STATES PATENT OFFICE 1,933,375

SYNTHETIC MANUFACTURE OF ACYL BENZOIC ACIDS

Bernard H. Jacobson, Charleston, W. Va., assignor, by mesne assignments, to The Calco Chemical Company, Inc., Bound Brook, N. J., a corporation of Delaware No Drawing. Application June 28, 1929
Serial No. 374,473

6 Claims. (Cl. 260—64)

This invention relates to synthetic manufacture of useful aromatic compounds; and it relates more particularly to processes in which dyestuff intermediates are synthetically prepared in accordance with the Friedel & Crafts synthesis by reaction between an aromatic hydrocarbon and another compound (either aromatic or not) in the presence of anhydrous aluminum chloride under such reacting conditions that the desired synthesis is effected in a simpler and more economical manner than has been possible heretofore.

In the commercial utilization of the Friedel & Crafts reaction heretofore, it has been customary to bring the reacting materials together in the cold and then to cause the reaction to go to completion by the application of heat, it having been believed necessary to apply heat for a substantial length of time in order to complete the reaction. Contrary to this prevailing view, it has now been found that reactions of this type can be carried to completion with satisfactory rapidity without any application of heat whatever. In fact withdrawal of heat during the progress of the reaction is found in many cases to be desirable in order to prevent rise of temperature above a certain relatively low figure at which reaction has been found to progress with satisfactory rapidity while at the same time darkening of the reaction mass or other injury from overheating is avoided.

In order that the principles of the invention may be made further apparent, concrete examples embodying said principles will now be described as illustrative of how the new process may be carried out in practice. As the invention is at present of particularly great utility in the manufacture of acyl-benzoic acid intermediates from which anthraquinones can be produced, the specific examples hereinafter given will relate particularly to this phase of the matter.

In making ortho-benzoyl-benzoic acid, for example, in accordance with the principles of the invention, 440 parts by weight of pure dry benzene are placed in a reaction vessel equipped with an iron agitator and a thermometer and provided with temperature-control means, such as a jacket through which a cooling medium may be passed. The benzene is then stirred and cooled until the temperature drops to below 20° C., say to 10° C. Thereupon, 200 parts by weight of finely powdered sublimed aluminum chloride is added and, with the agitator running, 100 parts by weight of powdered phthalic anhydride is gradually added at such a rate that the temperature does not rise above 20° C. The temperature is then allowed to rise to a maximum of about 20° C. if it has not already reached that point, whereupon some hydrochloric acid is evolved. The stirring being continued, and the temperature being held substantially constant at 20° C. through withdrawal of reaction heat by means of the cooling jacket, the melt commences to thicken after about 30 minutes and finally can be stirred only with difficulty, this stage normally being reached about 1½ hours after the commencement of operations. After the initial evolution of hydrochloric acid above mentioned, the mix remains quiescent with no visual indication of further evolution of hydrochloric acid; and it is believed that in the present process at least a substantial part of the hydrochloric acid evolved in the prior "hot" processes is retained in some form in the reaction mass. This is indicated by the fact that in the succeeding step of drowning the melt, it is necessary to use only from one-half to two-thirds as much mineral acid as is recommended when using the previously known processes.

When the condensation reaction is substantially complete, the resultant reaction mass is drowned in dilute hydrochloric acid to split off aluminum chloride with formation of orthobenzoyl-benzoic acid which may then be separated from the excess benzene and from the aqueous acid solution of aluminum chloride forming a layer below the layer of benzene. According to one available method of separation, the excess benzene is boiled away and the residue of ortho-benzoyl-benzoic acid is solidified by cooling and is filtered away from the acid chloride solution, washed thoroughly with water, and dried. The yield in a typical instance is about 158 parts by weight of an almost pure white crude ortho-benzoyl-benzoic acid. On dehydration with concentrated sulphuric acid, this gives 136 parts by weight of anthraquinone, or over 96 per cent of theory.

As above pointed out, materially less mineral acid is required in the drowning step than has been found necessary heretofore. Thus, in prior practice, it has been recommended to use in the drowning tub 90 parts by weight of 30% hydrochloric acid for each 100 parts by weight of phthalic anhydride employed in the reaction mix. In the present process, only about 45 to 60 parts by weight of 30% hydrochloric acid need be used. Another noticeable fact is that the splitting-off of the aluminum chloride seems to occur more easily when drowning the reaction mass obtained in accordance with the present process than is the case when drowning the reaction mass obtained by previously known methods. This may indicate that the organic aluminum-chloride compound as obtained in the present process differs somewhat in constitution from that obtained heretofore.

Where it is desired to make para-toluyl-benzoic acid, toluene is used in place of benzene and the temperature is most desirably so controlled as not to exceed a maximum of 25° C. As before, the reaction mass or melt thickens after about 1½ hours, after which it is drowned in dilute hydrochloric acid and the resultant para-toluyl-benzoic acid recovered in the same manner as described for ortho-benzoyl-benzoic acid. In a typical instance, the yield of para-toluyl-benzoic acid by this method is 162 parts by weight, yielding on dehydration with strong sulphuric acid 140 parts by weight of a light tan methyl-anthraquinone having a melting point of 174° C., this yield being over 93 per cent of theory.

While it is desirable for best results to avoid letting the temperature of the mix rise during the condensation reaction above the limits mentioned, this is not to be understood as essential in the broader aspects of the invention. The principal consideration is to avoid external heating and to permit the reaction to proceed at a relatively low temperature by self-heating alone. Even without withdrawal of heat by cooling the reaction vessel, the temperature does not rise materially above 40° to 45° C., if a sufficient excess of hydrocarbon or solvent be used to act as an internal cooling agent to the necessary extent.

The new process has a number of points of advantage over prior practice. When employing the much higher temperatures characterizing prior practice, the activity of the aluminum chloride is much greater and as a consequence there is darkening of the batch and some loss in yield. Hot aluminum chloride has a cracking or decomposing action upon hydrocarbons and organic compounds generally which the present cold reaction process almost wholly obviates. Furthermore, the present process reduces materially the difficulties encountered through corrosion of the apparatus when the hot method is used.

It will be apparent from the foregoing that the novel process, in its broader aspects, comprises first commingling, at a temperature below a predetermined relatively low reacting temperature, the substances which are to react in the Friedel and Crafts synthesis, and then letting the temperature of the mix rise through self-heating as a result of the initially very slow reaction ensuing, but without application of heat otherwise, until the predetermined desired reacting temperature is attained, which reacting temperature thereafter may desirably, but is not necessarily, maintained substantially constant by carefully regulated withdrawal of heat from the reaction mix, until the reaction is complete. The expression unsubstituted aromatic hydrocarbon as employed in the appended claims is intended to include benzene and its alkyl (alphyl and aryl) derivatives (e. g. toluene), but not to include substituted derivatives such as chlor-benzene.

What is claimed is:

1. In the manufacture of an acyl benzoic acid by the Friedel & Crafts synthesis, the process which comprises commingling at temperatures substantially below 40° C. phthalic anhydride, an unsubstituted aromatic hydrocarbon capable of forming a condensation product therewith and anhydrous aluminum chloride, permitting the temperature to rise to a predetermined maximum not substantially exceeding 40° C., and, by withdrawing reaction heat, maintaining the reaction temperature at about such maximum until reaction is substantially complete.

2. In the manufacture of an acyl benzoic acid by the Friedel & Crafts synthesis, the process which comprises commingling phthalic anhydride, benzene, and anhydrous aluminum chloride at temperatures below 20° C., permitting the temperature to rise by self-heating of the mix to about 20° C., and, by withdrawing reaction heat from the mix, maintaining the reaction temperature substantially constant at about 20° C. until the recation is substantially complete.

3. The process of manufacturing para-toluyl-benzoic acid which comprises commingling phthalic anhydride, toluene and anhydrous aluminum chloride, and permitting the resultant reaction to proceed of substantial completion by self-heating alone, said process being further characterized by the fact that the reacting conditions are such as to prevent the reaction temperature from substantially exceeding 40° to 45° C.

4. The process of manufacturing ortho-benzoyl-benzoic acid which comprises commingling phthalic anhydride, benzene and anhydrous aluminum chloride, and permitting the resultant reaction to proceed to substantial completion by self-heating alone, said process being further characterized by the fact that the reacting conditions are such as to prevent the reaction temperature from substantially exceeding 40° to 45° C.

5. The process of manufacturing an acyl-benzoic acid which comprises commingling phthalic anhydride, a benzenoid compound and anhydrous aluminum chloride, and permitting the resultant reaction to proceed to substantial completion by self-heating alone, said process being further characterized by the fact that the reacting conditions are such as to prevent the reaction temperature from substantially exceeding 40° to 45° C.

6. In the manufacture of an acyl-benzoic acid by the Friedel & Crafts synthesis, the process which comprises commingling phthalic anhydride, toluene, and anhydrous aluminum chloride, permitting the temperature of the reaction mixture to rise by self-heating to a reaction temperature not substantially exceeding 25° C., and maintaining the reaction temperature at not substantially exceeding 25° C. until the reaction is substantially complete.

BERNARD H. JACOBSON.